(12) United States Patent
Schroeder et al.

(10) Patent No.: US 11,655,885 B2
(45) Date of Patent: May 23, 2023

(54) MULTILINER FOR MULTIPLE START BALL NUT THREADS

(71) Applicants: Jonathan R. Schroeder, South Beloit, IL (US); Kevin Bischel, Rockton, IL (US); Ethan Kinney, South Beloit, IL (US)

(72) Inventors: Jonathan R. Schroeder, South Beloit, IL (US); Kevin Bischel, Rockton, IL (US); Ethan Kinney, South Beloit, IL (US)

(73) Assignee: Pacific Bearing Corp., Rockford, IL (US)

( * ) Notice: Subject to any disclaimer, the term of this patent is extended or adjusted under 35 U.S.C. 154(b) by 34 days.

(21) Appl. No.: 16/705,542

(22) Filed: Dec. 6, 2019

(65) Prior Publication Data

US 2021/0172504 A1 Jun. 10, 2021

(51) Int. Cl.
*F16H 25/22* (2006.01)

(52) U.S. Cl.
CPC .............................. *F16H 25/2223* (2013.01)

(58) Field of Classification Search
CPC ............. F16H 25/2223; F16H 25/2247; F16H 25/2228; F16H 25/2204
See application file for complete search history.

(56) References Cited

U.S. PATENT DOCUMENTS

| | | | |
|---|---|---|---|
| 2,519,777 A | 8/1950 | Cochrane | |
| 2,618,166 A | 11/1952 | Douglas | |
| 2,833,156 A | 5/1958 | Spontelli | |
| 3,156,133 A | 11/1964 | Anthony | |
| 3,161,073 A | 12/1964 | Deutsch et al. | |
| 3,198,029 A | 8/1965 | Orner | |
| 3,301,082 A * | 1/1967 | Kosinski | F16H 25/2223 74/424.87 |
| 3,327,551 A | 6/1967 | Prueter | |
| 3,372,605 A | 3/1968 | Orner | |
| 3,386,307 A | 6/1968 | Park et al. | |
| 3,580,098 A | 5/1971 | Goad et al. | |
| 3,667,311 A | 6/1972 | Wysong | |
| 3,815,435 A | 6/1974 | Eschenbacher et al. | |

(Continued)

FOREIGN PATENT DOCUMENTS

| | | |
|---|---|---|
| CN | 101676576 A | 3/2010 |
| EP | 0957294 A1 | 11/1999 |

(Continued)

OTHER PUBLICATIONS

Thompson Linear; Miniature Metric Ball Screws Higher Load Capacity in a Smaller Package for Laboratory, Medical and Mechatronic Applications; catalog; 2016; 8 pages.

(Continued)

*Primary Examiner* — Zakaria Elahmadi
(74) *Attorney, Agent, or Firm* — Reinhart Boerner Van Deuren P.C.

(57) ABSTRACT

A multiliner for a ball nut, a ball nut and a ball screw assembly are provided. Methods of forming the multiliner are also provided. The multiliner includes return channels that are configured to prevent bearing balls from falling out of a retaining region in a radial direction. This allows bearing balls to travel past intermediate grooves formed in a cooperating threaded ball screw shaft.

17 Claims, 11 Drawing Sheets

(56) References Cited

U.S. PATENT DOCUMENTS

| | | | |
|---|---|---|---|
| 4,226,137 A | 10/1980 | Sharp | |
| 4,342,235 A | 8/1982 | Benton | |
| 4,369,011 A | 1/1983 | Ploss | |
| 4,557,156 A | 12/1985 | Teramachi | |
| 4,841,796 A * | 6/1989 | Teramachi | F16H 25/2418 411/432 |
| 4,887,480 A | 12/1989 | Pollo | |
| 4,905,534 A | 3/1990 | Andonequi | |
| 5,094,119 A | 3/1992 | Virga et al. | |
| 5,193,409 A | 3/1993 | Babinski | |
| 5,388,475 A * | 2/1995 | Shear, III | F16H 25/2223 264/318 |
| 5,555,770 A | 9/1996 | Dolata et al. | |
| 5,622,082 A | 4/1997 | Machelski | |
| 5,711,188 A | 1/1998 | Miyaguchi et al. | |
| 5,937,700 A | 8/1999 | Brown et al. | |
| 6,092,434 A | 7/2000 | Matsumoto et al. | |
| 6,112,610 A * | 9/2000 | Welling | F16H 25/2223 74/424.86 |
| 6,397,697 B1 | 6/2002 | Ninomiya et al. | |
| 6,454,042 B1 * | 9/2002 | Yoshida | B62D 5/0448 180/444 |
| 6,813,969 B2 | 11/2004 | Huang | |
| 7,013,747 B2 | 3/2006 | Drake | |
| 7,523,682 B2 | 4/2009 | Liao et al. | |
| 9,010,210 B2 * | 4/2015 | Chen | F16H 25/2223 74/424.83 |
| 9,091,336 B2 * | 7/2015 | Lin | F16H 25/22 |
| 2002/0028122 A1 * | 3/2002 | Kuo | F16H 25/2219 411/429 |
| 2004/0000207 A1 * | 1/2004 | Huang | F16H 25/2223 74/424.86 |
| 2005/0076733 A1 * | 4/2005 | Yamamoto | B62D 5/0448 74/424.87 |
| 2006/0156843 A1 * | 7/2006 | Becker | F16H 25/2214 74/424.82 |
| 2006/0169079 A1 | 8/2006 | Lee et al. | |
| 2007/0000342 A1 | 1/2007 | Kazuno | |
| 2007/0186708 A1 | 8/2007 | Liao et al. | |
| 2007/0295132 A1 * | 12/2007 | Lin | F16H 25/2223 74/424.86 |
| 2009/0084212 A1 * | 4/2009 | Niwa | F16H 25/2223 29/898.067 |
| 2009/0268994 A1 * | 10/2009 | Kawashima | F16H 25/2204 29/898.063 |
| 2010/0031763 A1 * | 2/2010 | Kuo | F16H 25/2223 74/424.86 |
| 2010/0101348 A1 * | 4/2010 | Teramachi | F16H 25/2223 74/424.81 |
| 2012/0090419 A1 * | 4/2012 | Kuo | F16H 25/2223 74/424.86 |
| 2015/0033891 A1 * | 2/2015 | Sakaguchi | F16H 25/2204 74/424.87 |
| 2016/0341291 A1 * | 11/2016 | Suzuki | F16H 25/2219 |
| 2017/0036275 A1 * | 2/2017 | Haimer | F16H 25/2223 |
| 2018/0073616 A1 * | 3/2018 | Kawaguchi | B22F 3/02 |
| 2018/0209521 A1 * | 7/2018 | Kreutzer | F16H 25/2219 |
| 2018/0274640 A1 * | 9/2018 | Shimizu | F16H 25/2223 |

FOREIGN PATENT DOCUMENTS

| | | | |
|---|---|---|---|
| EP | 3255306 A1 * | 12/2017 | F16H 25/2223 |
| JP | 2003/329099 A | 11/2003 | |
| JP | 2010/007684 A | 1/2010 | |
| WO | WO 2014/108792 A1 | 7/2014 | |

OTHER PUBLICATIONS

Machine design.com; Ball-Screw Design: The Advantages of Internal Ball Returns; online magazine; Feb. 2016; 1 pages.

* cited by examiner

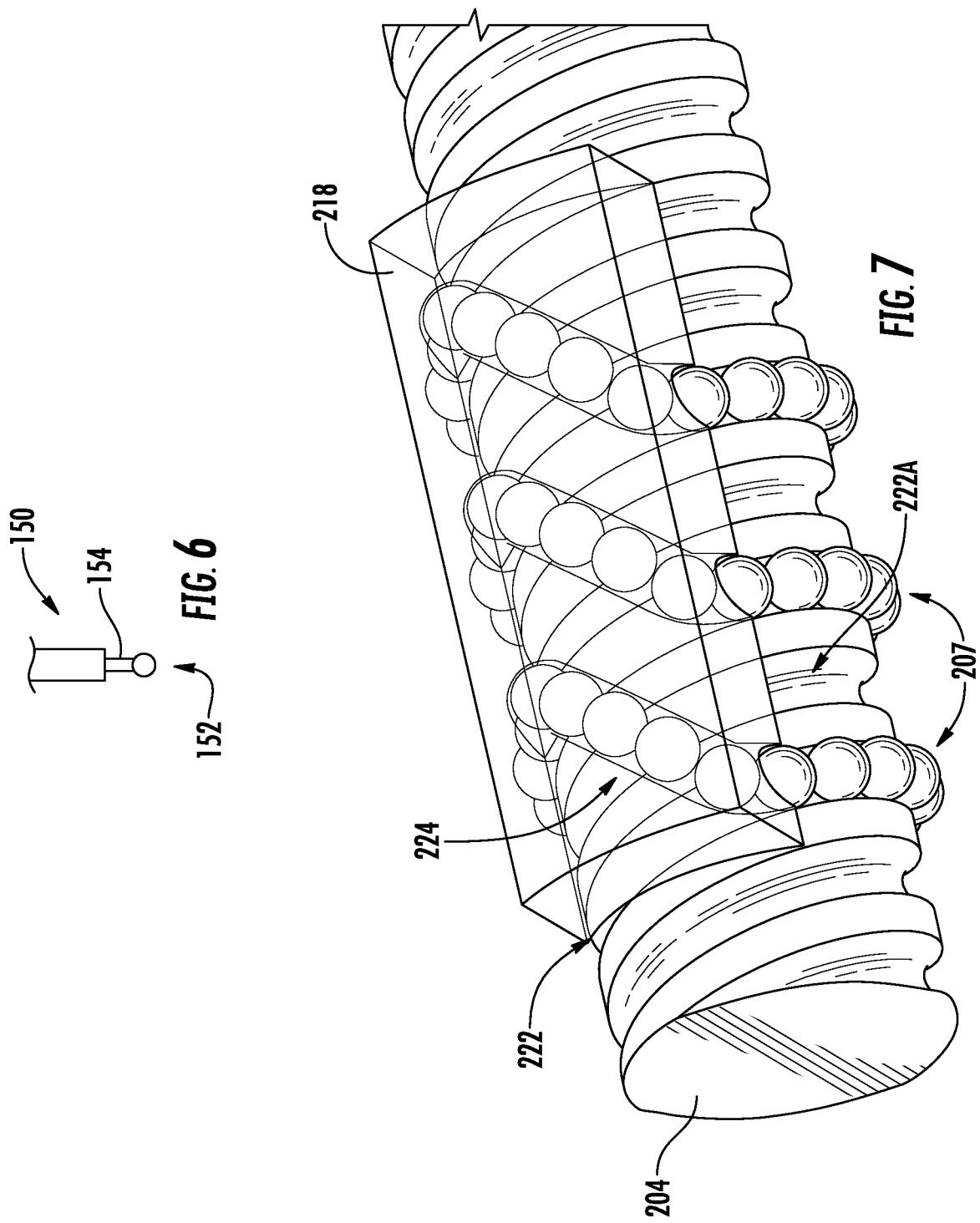

MULTILINER FOR MULTIPLE START BALL NUT THREADS

FIELD OF THE INVENTION

This invention generally relates to multiliners for circulating bearing balls within a ball nut for use in ball screw assemblies.

BACKGROUND OF THE INVENTION

Ball screw assemblies are used to convert rotational motion to linear motion. A ball screw assembly typically includes a ball nut, a threaded shaft and a plurality of bearing balls positioned between the ball nut and the threaded shaft to transfer forces between the threaded shaft and ball nut.

Multiliners are commonly designed to perform a ball return function in the ball nut. Multiliners function by causing bearing balls to rise over the thread flank and crest and then drop back into the adjacent preceding thread groove. Thus, each bearing ball travels around a single loop and is returned to a same place in the loop by the multiliner.

Currently multiliners are only designed for single start threads of short lead lengths. Thus, they are not concerned with transferring bearing balls past an intermediate thread groove.

BRIEF SUMMARY OF THE INVENTION

In an embodiment, a multiliner for a ball nut that uses a plurality of recirculating bearing balls is provided. The multiliner includes a body and at least one ball return channel formed in the body. The body defines a longitudinal axis. The at least one ball return channel has a first opening at a first end of the ball return channel and a second opening at a second end of the ball return channel. The first and second openings are large enough to allow the bearing balls to pass through the openings. The return channel includes a retaining region positioned between and communicating the first and second openings. The retaining region is sized to prevent the bearing balls from falling out of the retaining region, e.g. in a radial direction relative to the longitudinal axis, as the bearing balls transition from the first opening to the second opening.

In one embodiment, the first opening is positioned at a first axial position along the longitudinal axis and the second opening is positioned at a second axial position along the longitudinal axis that is axially offset along the longitudinal axis from the first axial position.

In one embodiment, the retaining region is a slot that includes an open mouth on a radially inner side of the return channel. The open mouth is smaller in dimension than the diameter of the recirculating bearing balls.

In one embodiment, the mouth of the retaining region is formed between walls that extend toward one another. Each wall forms an undercut region that extends under the bearing balls. The undercuts prevent the bearing balls from dropping out of the retaining region in the radial direction.

In one embodiment, the retaining region is a fully enclosed channel, e.g. tube, extending between the first and second openings.

In an embodiment, a ball nut is provided. The ball nut includes any one of the multiliners outlined above and a nut body. The nut body extends between a first end and a second end along a central axis. The central axis is parallel to or collinear with the longitudinal axis of the multiliner. The nut body has a bore defined by an inner surface extending angularly about the central axis. The inner surface defines at least one helical thread groove extending angularly about the central axis and axially along the central axis. The first opening of the multiliner is located at and is in communication with a first portion of the at least one thread groove and the second opening of the multiliner is located at and is in communication with a second portion of the at least one thread groove.

In one embodiment, the multiliner and nut body are formed from a continuous piece of material.

In another embodiment, the nut body includes a thread portion and the multiliner that combine to form ball circuits. These components may be formed from separate pieces.

In one embodiment, the nut body includes an outer casing, the multiliner is an insert that is inserted into a multiliner receiving slot of the outer casing.

In one embodiment, the at least one thread groove includes a plurality of adjacent thread grooves including a first thread groove for a first thread start and a first thread groove for a second thread start. The first portion of the at least one thread groove and the second portion of the at least one thread groove are parts of the first thread start such that any bearing ball that traveled between the first portion and second portion of the at least one thread groove through the ball return channel remain associated with the first thread start.

In one embodiment, the first and second openings are axially spaced apart along the central axis such that at least a portion of the first thread groove for the second thread start is located axially between the first and second openings along the central axis.

In one embodiment, the at least one thread grooves includes a first thread groove, at least one intermediate thread groove and a last thread groove with the at least one intermediate thread groove positioned axially between the first and last thread grooves along the central axis. The first and second openings of the ball return channel being axially spaced along the central axis with the at least one intermediate thread positioned axially between the first and second openings such that a bearing ball traveling through the ball return channel between the first and second openings will travel past the at least one intermediate thread groove.

In one embodiment a ball screw is provided. The ball screw includes any one of the ball nuts outlined above. The ball screw also includes a ball screw shaft defining at least one helical ball screw thread groove. A plurality of bearing balls are located radially between the at least one ball screw thread and the ball nut.

In one embodiment, the at least one ball screw thread groove includes a first ball screw thread groove, at least one intermediate ball screw thread groove and a last ball screw thread groove with the at least one intermediate ball screw thread groove positioned axially between the first and last ball screw thread grooves. The first and second openings are axially spaced apart along the longitudinal axis with the at least one intermediate thread groove is positioned axially between the first and last ball screw thread grooves. As such, as the plurality of bearing balls travel between the first and second openings, the plurality of bearing balls travel past the at least one intermediate thread groove.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 6 is a tool for forming an embodiment of the multiliner;

FIG. 7 is a simplified illustration of an alternative embodiment of an assembly that does not have bearing balls in consecutive grooves;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
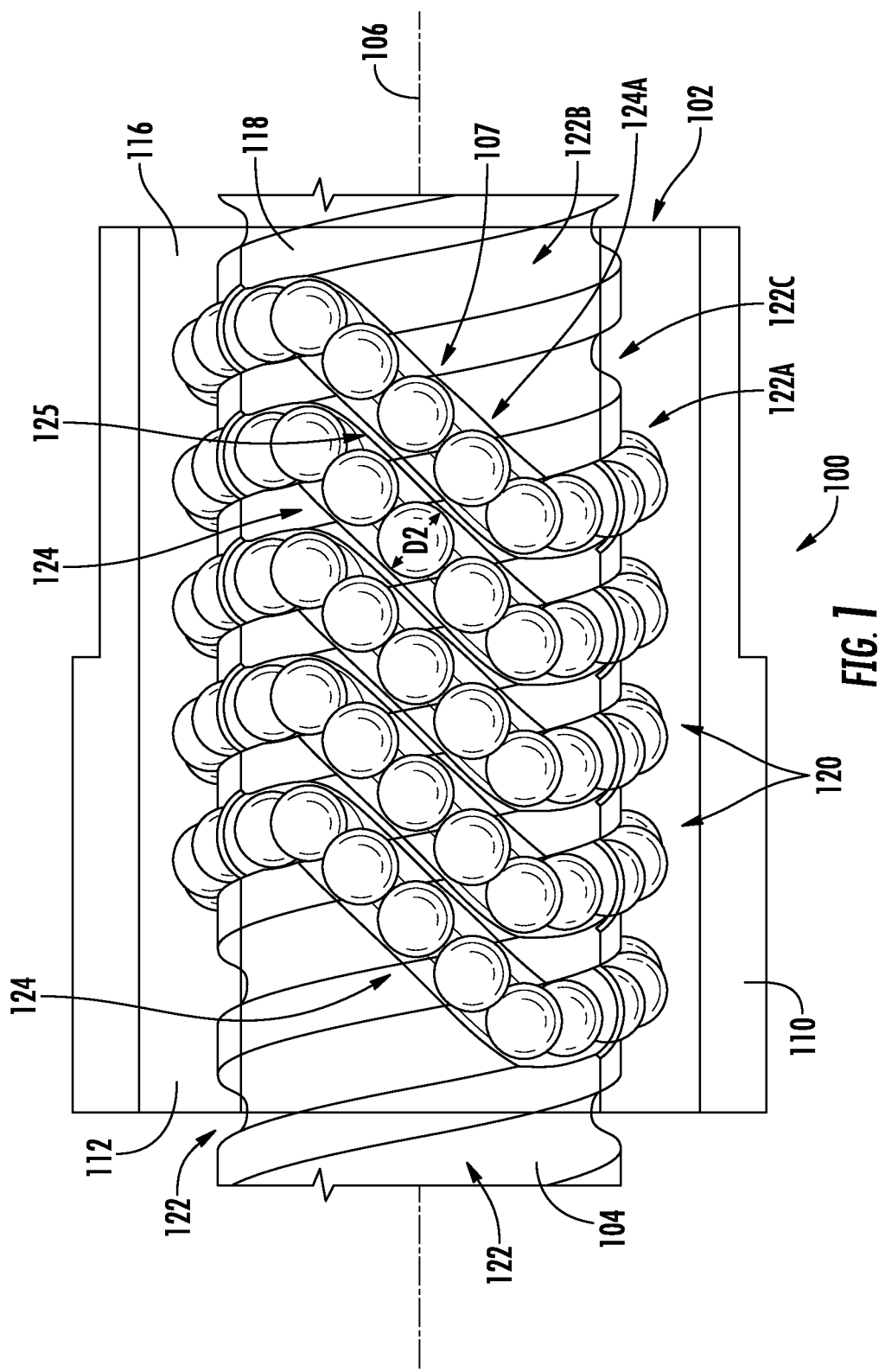
FIG. 1 is a simplified transparent illustration of ball screw assembly according to an embodiment of the present invention.

FIG. 1 is a simplified illustration of a ball screw assembly 100 including a ball nut 102 and a threaded shaft 104. The ball nut 102 is shown being transparent so that the internal components can be viewed. The ball screw assembly 100 can be used to convert rotational motion into linear motion. More particularly, shaft 104 can rotate about longitudinal axis 106 to cause ball nut 102 to move linearly parallel to longitudinal axis 106.

The ball screw assembly 100 includes a plurality of bearing balls 107 located radially between the ball nut 102 and the threaded shaft 104. The bearing balls 107 transfer forces between the ball nut 102 and threaded shaft 104. By using bearing balls 107 the forces are transferred at low friction making the force transfer highly efficient.

The ball nut 102 includes a nut body that includes, in this embodiment, an outer casing 110 that may be operably connected to a object to be translated linearly. While not shown, the casing 110 could include a flange that receives fasteners to connect to external objects. In alternative embodiments, a portion of the outer periphery of the casing could be threaded to connect to an external object. Other connections are contemplated between the ball nut 102 and any object to be driven.

The nut body includes a liner 112 located within the outer casing 110. The liner 112 of the ball nut 104 defines a plurality of ball circuits or pathways (referred to herein as ball circuits) along which the bearing balls 107 travel as the ball nut 102 travels along axis 106 relative to shaft 104. The ball circuits recirculate the bearing balls 107. In the illustrated embodiment, the nut body defines a bore. The inner surface of the bore provides the ball circuits.

The liner 112 of the illustrated embodiment includes two components, a thread portion 116 and a multiliner 118 that provide the bore and ball circuits. In some embodiments, the thread port 116 is formed as an integral part of the outer casing 110. In such an embodiment, only the multiliner 118 would be a separate component.

The multiliner 118 may be made of plastic or metal.

The thread portion 116 includes a plurality of adjacent thread grooves 120 that correspond to the thread grooves 122 of shaft 104. The thread grooves 120, 122 are typically helical thread grooves that extend about and axially along axis 106. These grooves 120, 122 would have the same number of thread starts (e.g. independent threads), thread pitch and lead as the shaft 104.

Figure 2:
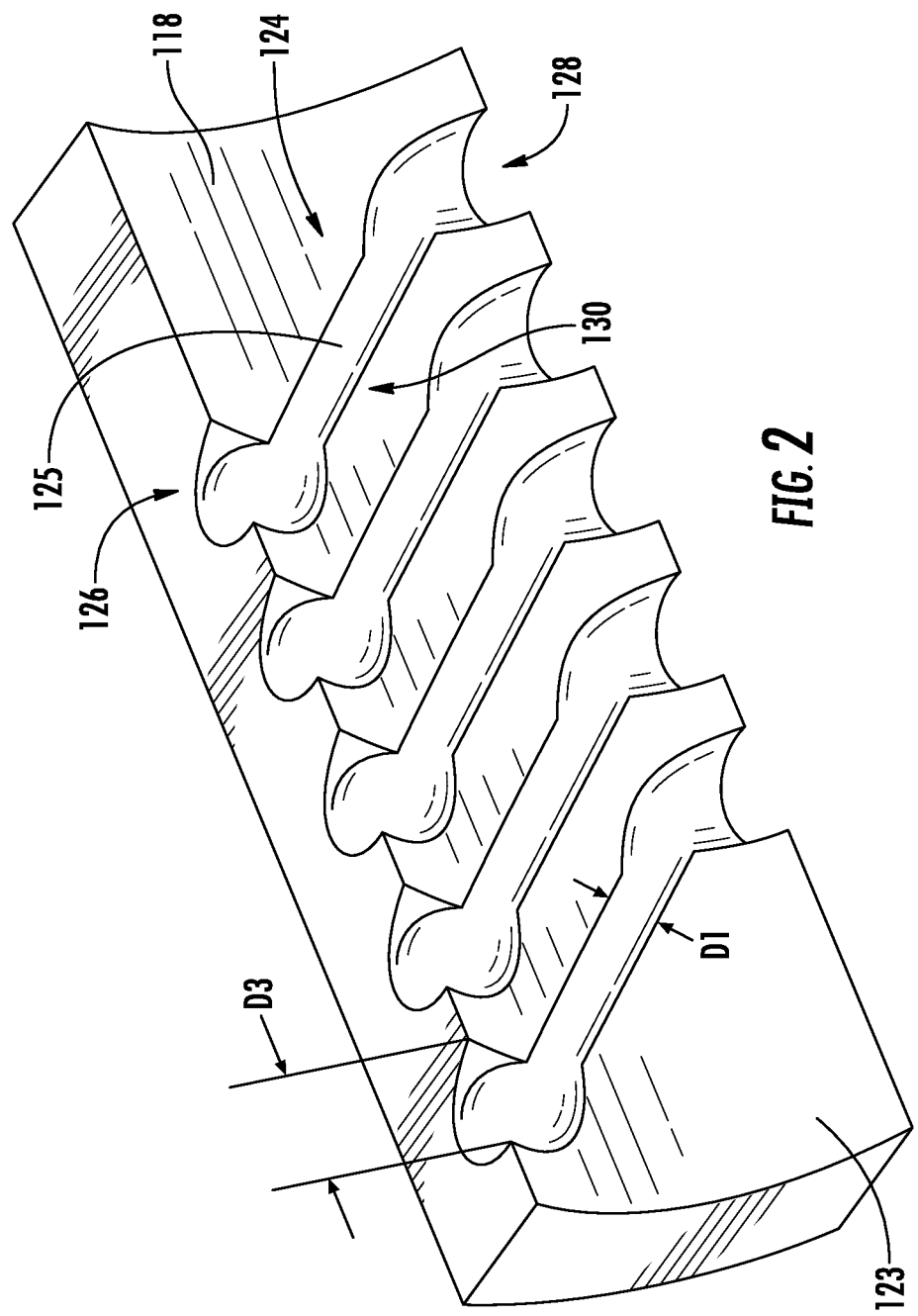
FIG. 2 is a perspective illustration of a multiliner used in the ball screw assembly of FIG. 1.

With additional reference to FIG. 2, the multiliner 118 includes a body 123 that provides ball return channels 124. The return channels 124 allow the bearing balls 107 to be recirculated. Without the return channels 124, the bearing balls would simply fall out of the end of the ball nut 102. The ball return channels 124 lift the bearing balls 107 out of the thread grooves 122 of the shaft 104 and allow the bearing balls 107 to transition over and past adjacent thread grooves 122 to an opposite end of the ball circuit. When located within the ball return channels 124, the bearing balls 107 are entirely guided by the multiliner 118 and thus are subject to relatively low forces at this time.

The return channels 124 include a retaining region 125 that extends between and communicates opposed first and second openings 126, 128. In this embodiment, the openings 126, 128 are axially offset from one another along axis 106. The first and second openings 126, 128 are sized large enough such that the bearing balls 107 may pass into the openings and then into the retaining region 125. In this embodiment, the openings 126, 128 are also angularly offset about axis 106. In other embodiments, the openings may be only axially offset or may be only angularly offset. This can depend on the pitch of the threads of the shaft 104.

The openings 126, 128 are in communication with corresponding thread groove portions 120 of the thread portion 116. In some embodiments, the thread groove portions 120 are of a same thread start or could be of different thread starts. Preferably, the openings 126, 128 communicate with different thread groove portions 120 of a same thread start. Thus, the bearing balls 107 always remain within the thread groove of a single thread start.

Figure 3:
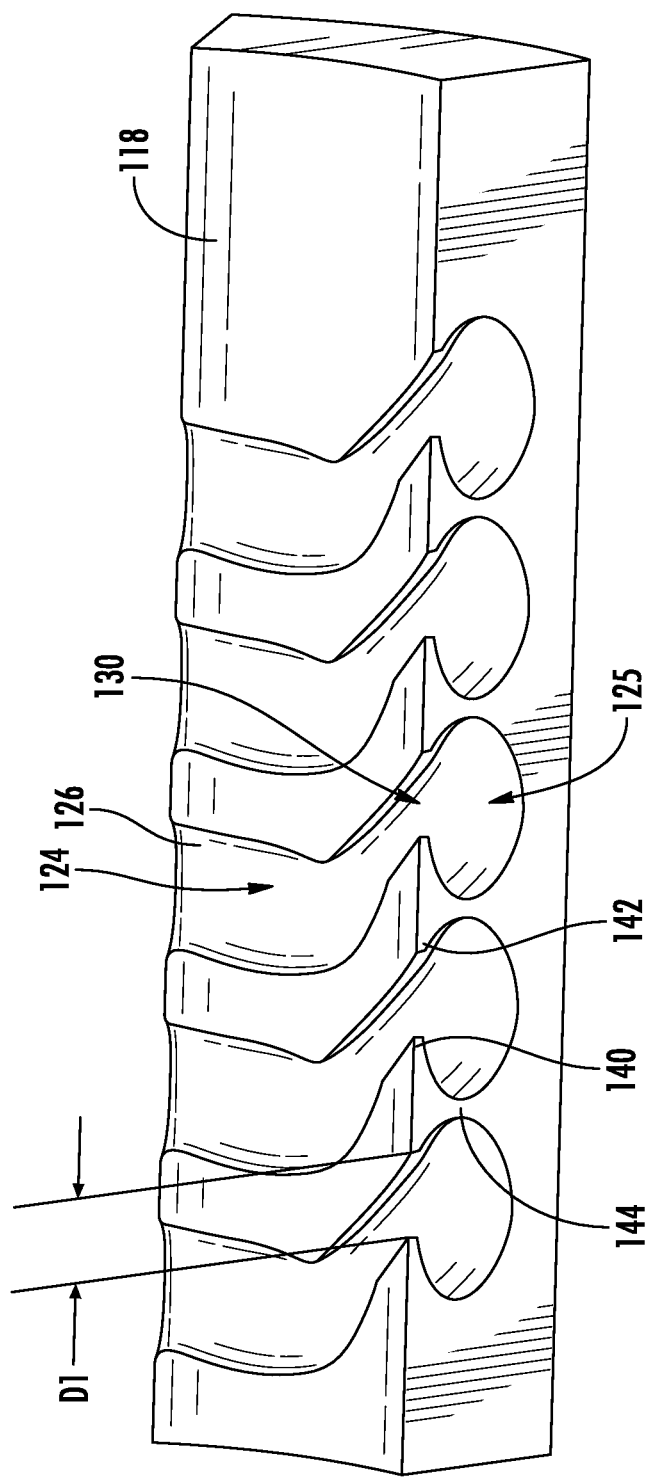
FIG. 3 is a partial cross-sectional illustration of the multiliner in FIG. 2.

With additional reference to FIG. 3, in the illustrated embodiment, the retaining region 125 is a generally C-shaped channel that defines a mouth 130. The mouth 130 is sized to be smaller in dimension D1 than the diameter D2 of the bearing balls 107 such that the bearing balls 107 cannot drop out of the retaining region 125 as the bearing balls 107 transition between the opposed openings 126, 128. In this embodiment, the walls that define the retaining region 125 extends more than 180 degrees around the corresponding bearing balls 107 as they travel through the retaining region 125. This prevents the bearing balls 107 from falling radially (relative to axis 106) out of the retaining region 125.

However, as noted above, the dimension D3 of the first and second openings 126, 128 is greater than D1 and D2 such that the bearing balls 107 may enter into the return channels 124.

Figure 4:
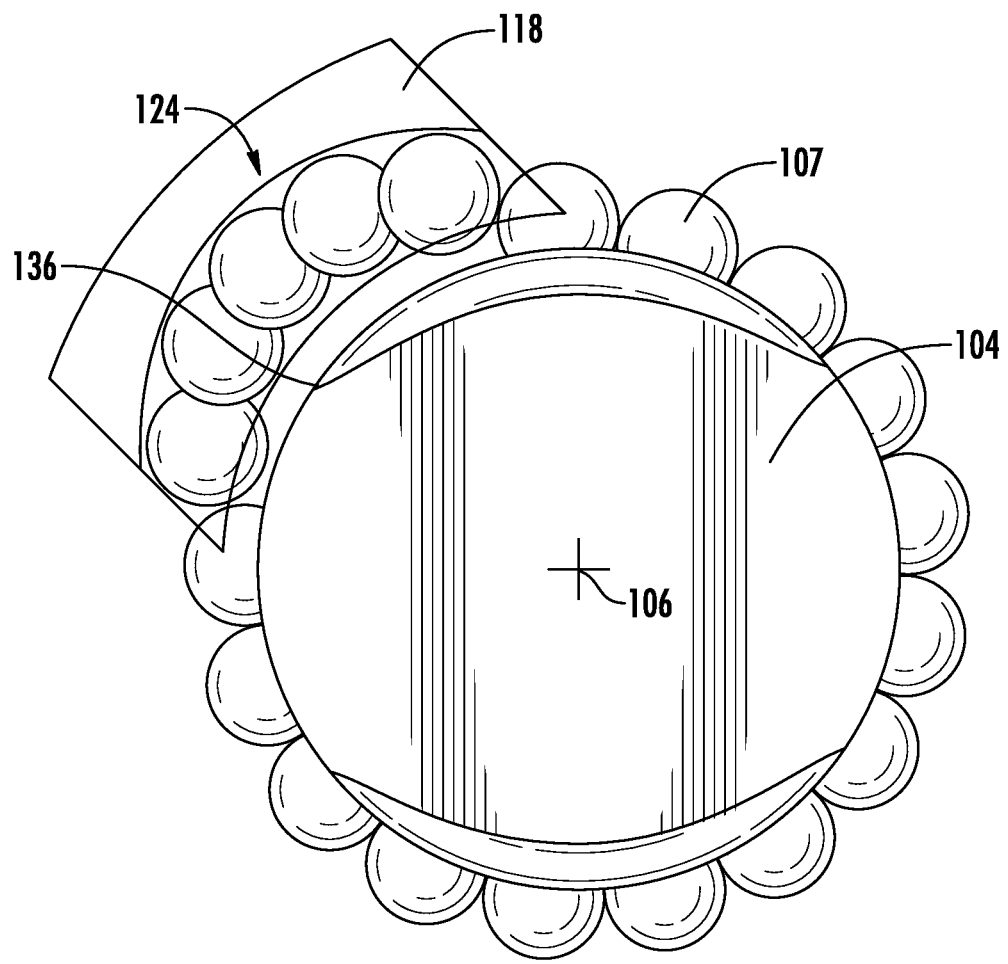
FIG. 4 is a partial end view of the ball screw assembly of FIG. 1 illustrating the multiliner, threaded shaft and bearing balls.
Figure 5:
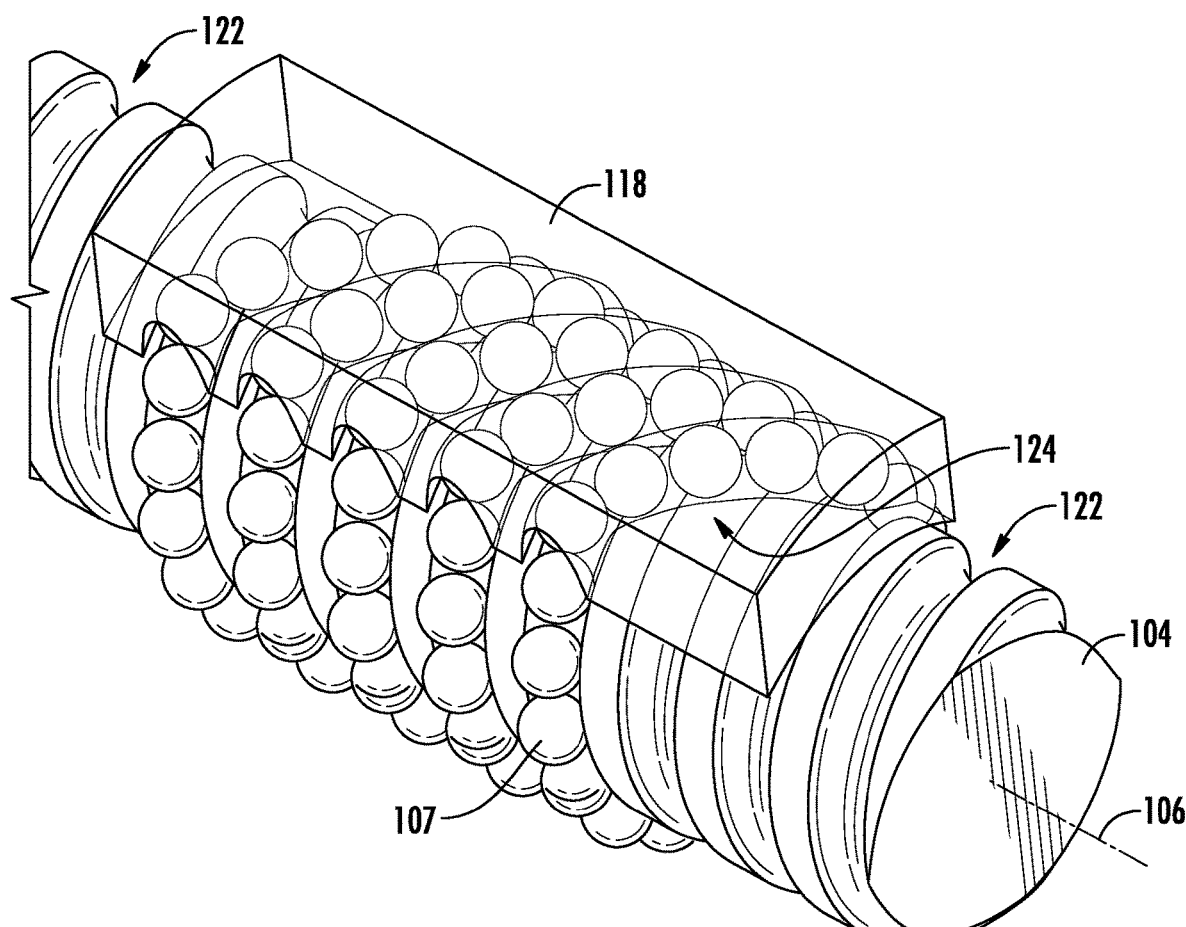
FIG. 5 is a simplified perspective view of the threaded shaft, multiliner and bearing balls of FIG. 4, the multiliner being shown as transparent so that the bearing balls can be viewed.

With additional reference to FIGS. 4 and 5, the multiliner 118, and particularly the return channels 124 are configured to lift the bearings out of thread grooves 122 of the shaft 104. This is illustrated in FIG. 4 by the bearing balls 107 being spaced radially outward from the outer periphery 136 of the shaft 104, e.g. the radially outermost portion (e.g. crest) of the radially extending thread flanks that are interposed between adjacent thread grooves 122.

In the illustrated embodiment, the shaft 104 is a multistart threaded shaft, and particularly the shaft includes two thread starts. The multiliner 118 is designed to transfer the bearing balls 107 between different portions of the same thread start at different axial locations along axis 106. To do this, because there are multiple thread starts, the multiliner 118 must allow the bearing balls 107 to travel past thread grooves.

With reference to FIG. 1, the multiliner 118 includes a particular return channel 124A. This return channel 124A allows bearing balls 107 to transition between thread grooves 122A and 122B, which are different portions of a same groove, while bypassing over and not dropping into thread groove 122C, which forms a portion of a different thread start.

With reference to FIG. 3, the mouth 130 of retaining region 125 is formed by two inward extending projections 140, 142. Again, the spacing between these two projections 140, 142 is such that a bearing ball 107 cannot extend through the mouth 130 and fall out of the retaining region 125. The projections 140, 142 extending from a radially extending separation wall 144 that is positioned between adjacent return channels 124.

Because of this configuration, the retaining region 125 is the portion of the return channel 124 that extends across the intermediate thread groove 122C discussed above that the bearing balls 107 are allowed to bypass.

In some embodiments, the retaining region could be a completely closed passage or tube that does not include mouth 130.

While the current ball nut includes multiple components including a casing portion 110, a thread portion 116 and a multiliner 118, it is contemplated that all of these components could be a single body. In an optional configuration, the single body could be formed from a single continuous piece of material. In other embodiments, the thread portion and multiliner 118 are formed from a single piece of material that is then inserted into casing portion 110. In a further embodiment, the casing portion 110 may have locating structure for locating the multiliner 118 within the casing portion 110. For example, the inner periphery of the casing portion could have an axially extending channel in which the multiliner is axially inserted for mounting the multiliner 118 to the casing portion 110.

In a preferred embodiment, such as the embodiment, in FIGS. 2 and 3, the return channel has the open mouth 130. FIG. 6 illustrates a tool 150 that can be used to form the return channel 124. More particularly, the tool 150 has an enlarged head 152 that can extend through the mouth and form the undercuts that are provided by projections 140, 142. The head 152 is attached to a neck 154 that is smaller in dimension than mouth 130.

In another embodiment, such as, but not only, when the return region 125 is a completely closed tube, the multiliner 118 could be formed by molding different halves of the return channel 124 into separate pieces and then securing the two pieces together, e.g. by adhesive, welding, etc.

In a further embodiment, the multiliner 118 could be formed by 3D printing.

Figure 8:
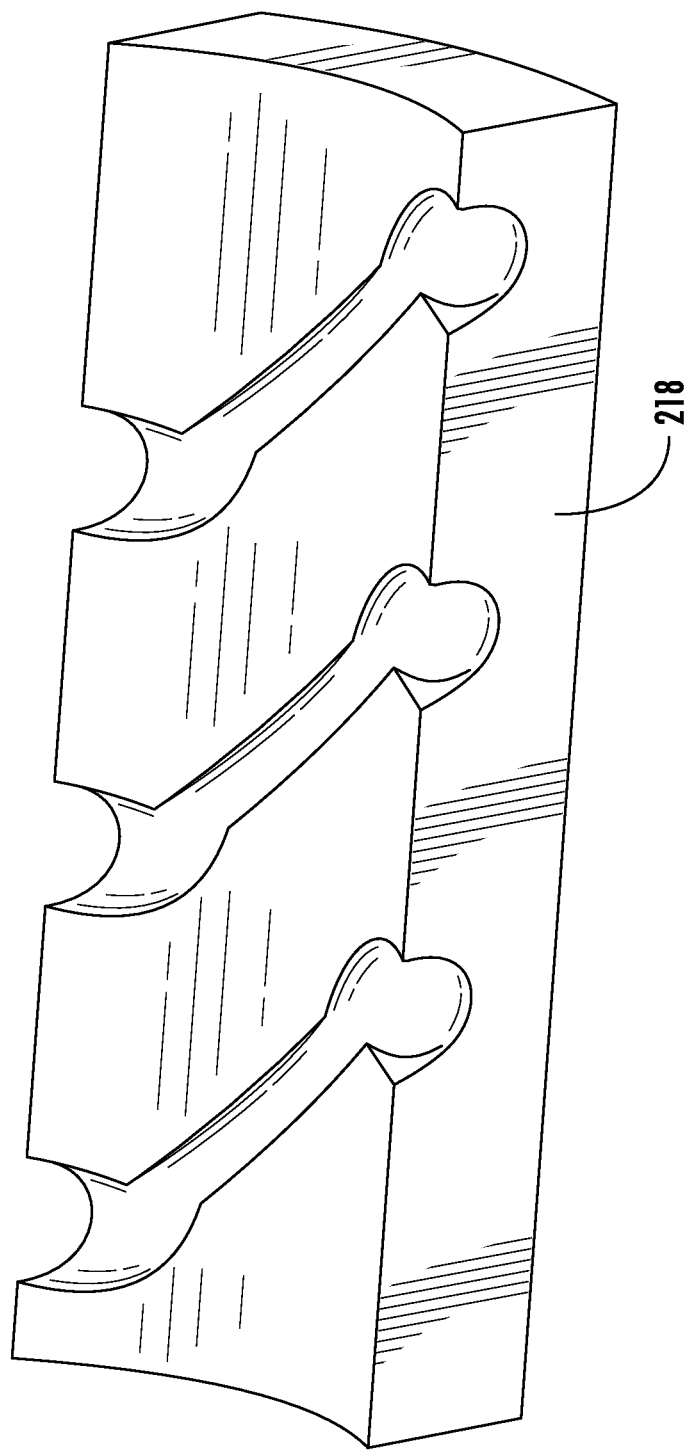
FIG. 8 is a perspective illustration of the multiliner used in the system of FIG. 7.
Figure 9:
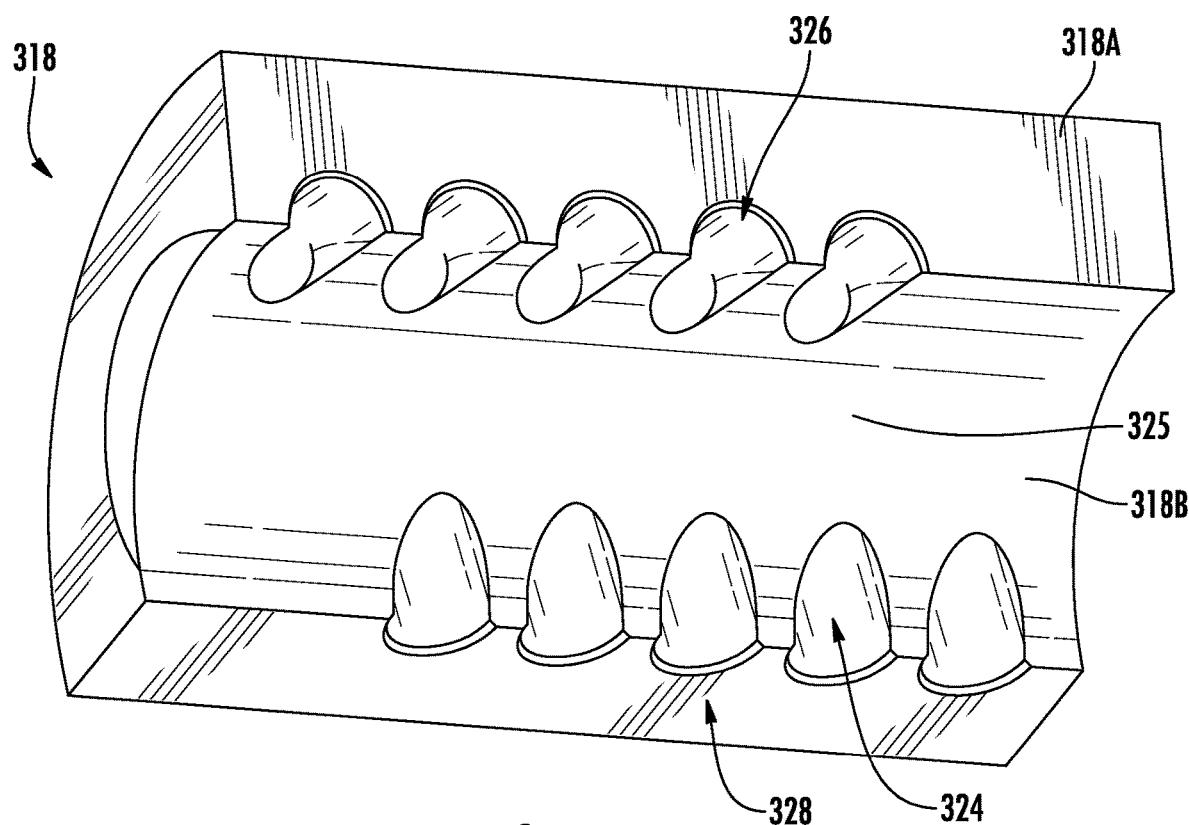
FIGS. 9-12 illustrate a further embodiment where the multiliner includes retaining regions that are continuous tubes.
Figure 10:
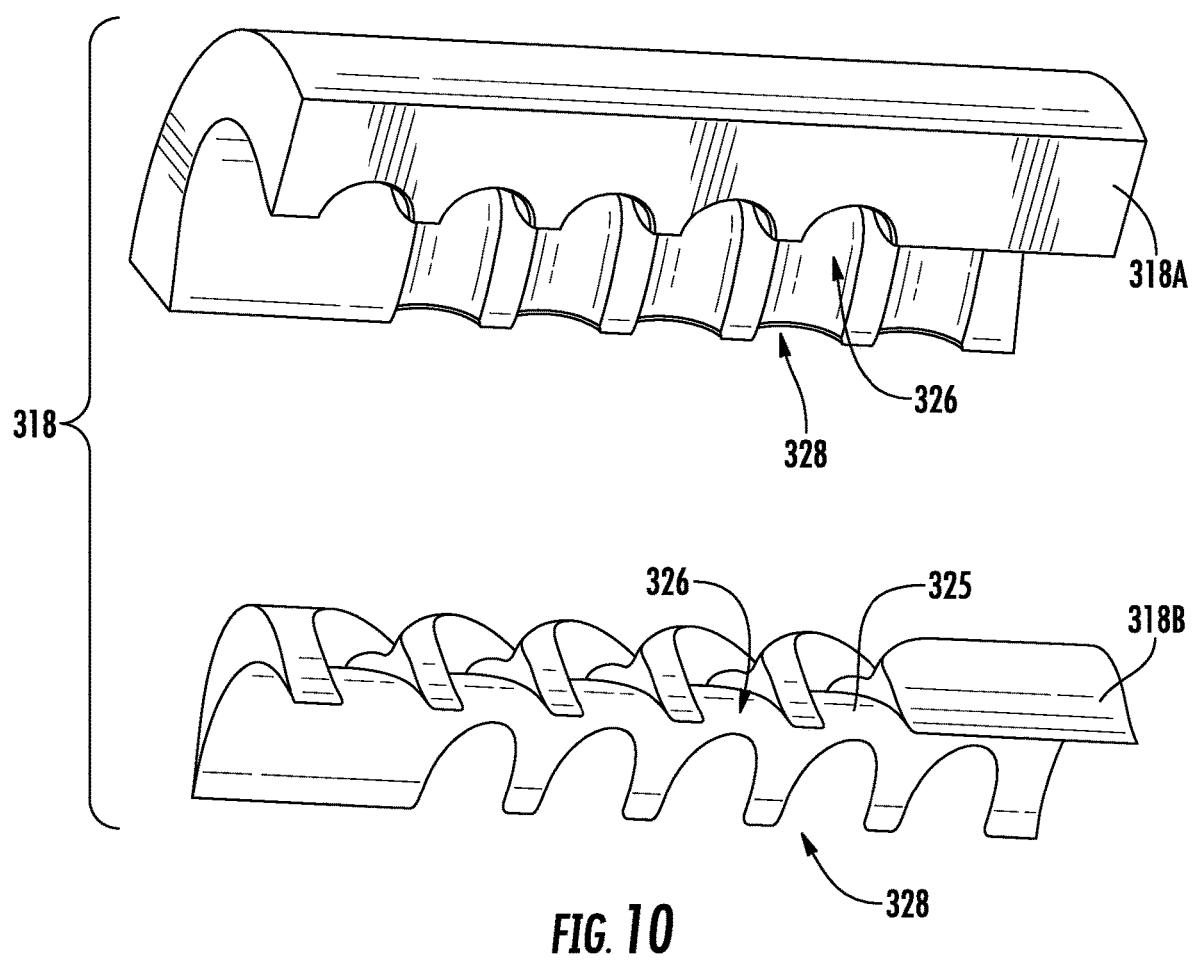
Figure 11:
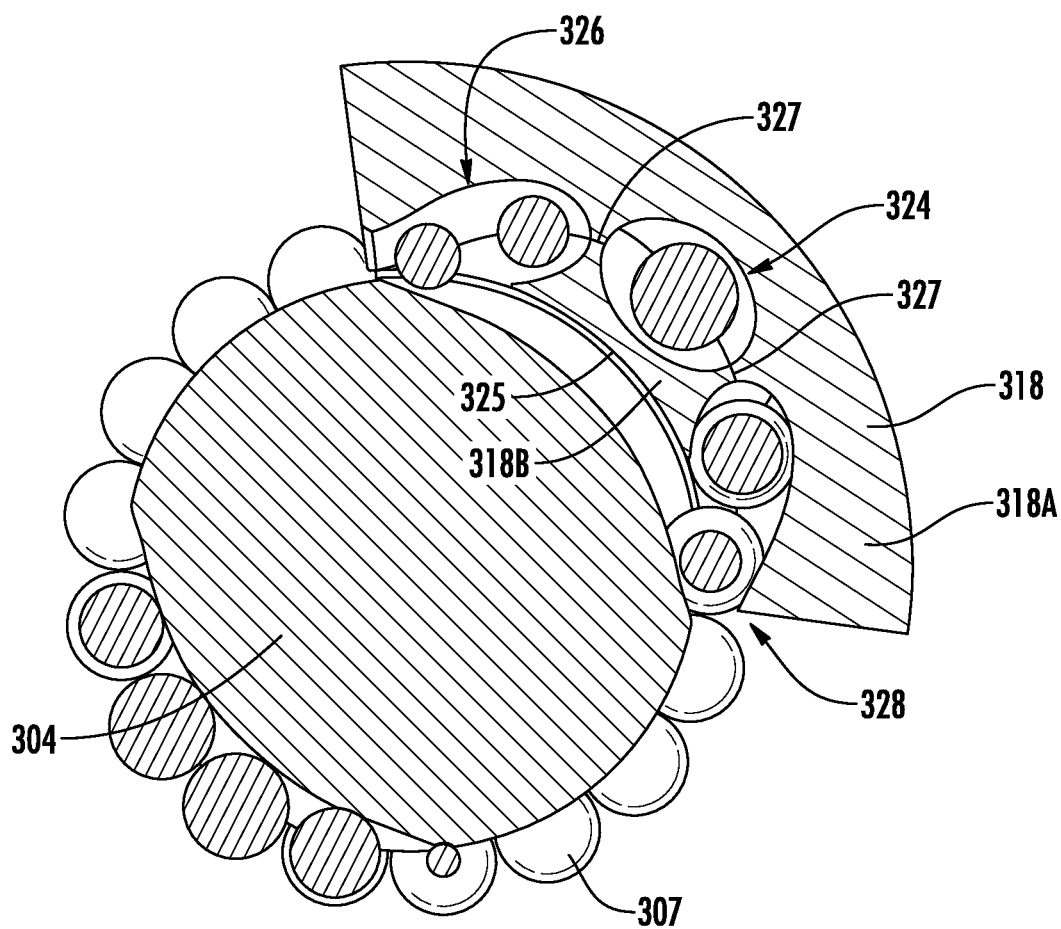
Figure 12:
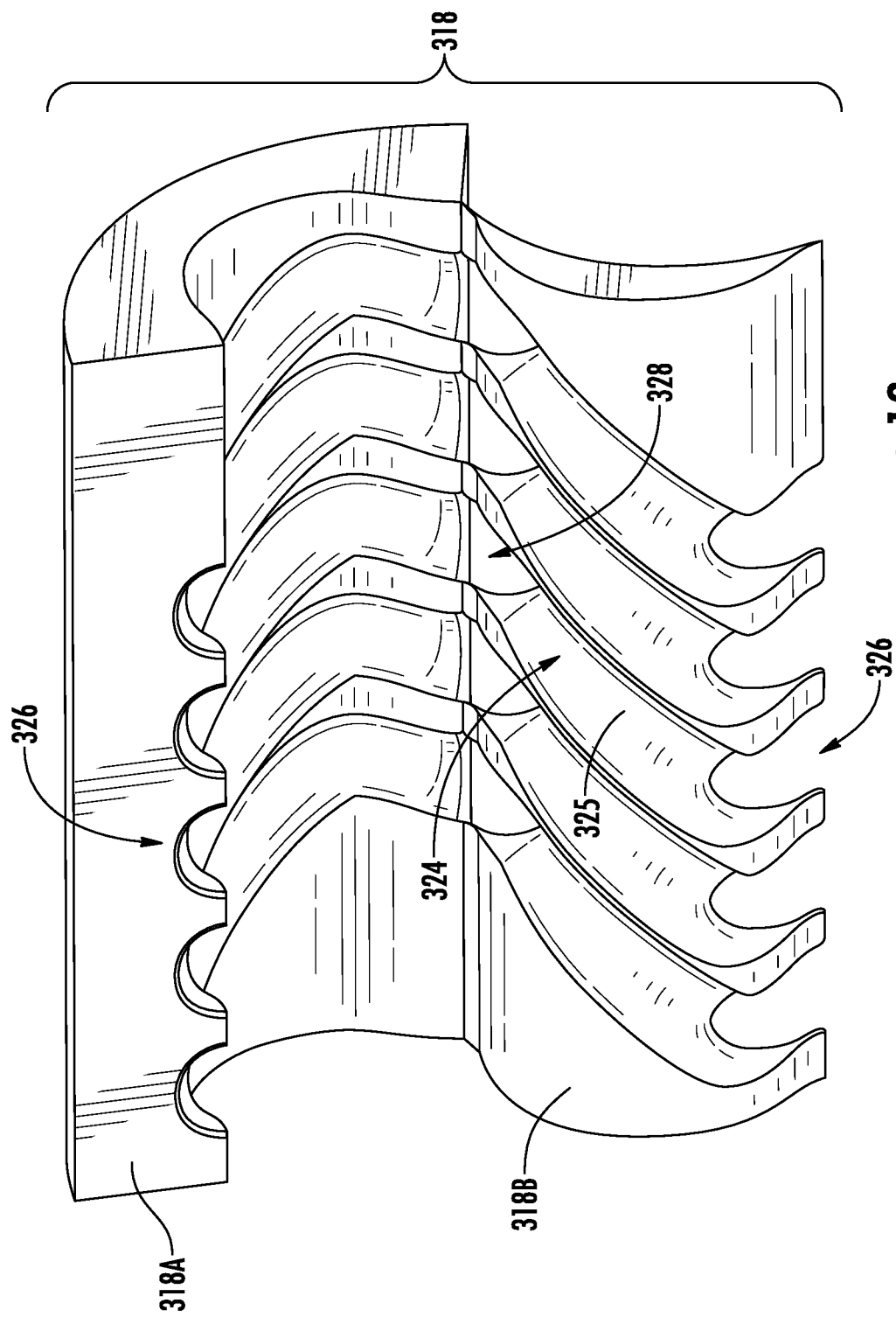

FIGS. 7 and 8 illustrate a further embodiment. In this embodiment, bearing balls 207 are not located in adjacent grooves 222 in the shaft 204. Instead, the system is configured that every other groove 222 is empty, such as groove 222A.

The corresponding multiliner 218 is configured for this arrangement. In particular, there are fewer return channels 224 that are spaced further apart as compared to multiliner 118 of prior embodiments.

This configuration will prevent bearing balls 207 from contacting both sides of the thread flanks. This can make the thread flanks stronger and provide for alternative geometries.

FIGS. 9-12 illustrate an embodiment of a multiliner 318 where the return channels 324 through which the bearing balls 307 travel are continuous tubes. The return channels 324 have openings 326, 328 that are connected by a retaining region 325. The retaining region 325 is a continuous tube.

To form the continuous tube retaining region 325, the multiliner 318 is formed from two separate components 318A and 318B (see FIG. 10) that are then combined together. The separate pieces could be molded and then connected together such as by way of adhesive, chemical bonding, ultrasonic bonding, etc. Typically, the pieces will each form substantially half of each retaining region. This is illustrated by seems 327 in FIG. 11. Thus, each piece forms part of the dividing wall formed between adjacent return channel 324.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A multiliner for a ball nut for use with a threaded shaft, the ball nut having a plurality of recirculating bearing balls, the multiliner comprising:
a body defining a longitudinal axis, the body extending axially between a first end and a second end;
at least one ball return channel formed in the body having a first opening at a first end of the ball return channel and a second opening at a second end of the ball return channel, the first and second openings being large enough to allow the bearing balls to pass through the openings, the return channel including a retaining region positioned between and communicating the first and second openings, the retaining region being sized to prevent the bearing balls from falling out of the retaining region as the bearing balls transition from the first opening to the second opening; and
wherein the retaining region is a fully enclosed channel extending between the first and second openings
wherein, the body defines a radially inner most surface portion angularly between the first and second openings, the surface portion having a constant concave, arcuate, cross-sectional shape the entire extent from the first end of the body to the second end of the body such that the cross-sectional shape of the surface portion is the same at all axial positions between the first end and the second end when moving parallel along the longitudinal axis.

2. The multiliner of claim 1, wherein the first opening is positioned at a first axial position along the longitudinal axis and the second opening is positioned at a second axial position along the longitudinal axis that is axially offset along the longitudinal axis from the first axial position.

3. A ball nut comprising:
a multiliner according to claim 1; and
a nut body extending between a first end and a second end along a central axis, the nut body having a bore defined by an inner surface extending angularly about the central axis, the inner surface defining at least one helical thread groove extending angularly about the central axis and axially along the central axis, the first opening of the multiliner located at and being in communication with a first portion of the at least one thread groove and the second opening of the multiliner located at and being in communication with a second portion of the at least one thread groove;
wherein the nut body includes an outer casing and the multiliner is an insert that is inserted into a multiliner receiving slot of the outer casing;
wherein the body is formed from first and second components, the first component forming a portion of the fully enclosed channel and the second component forming a portion of the fully enclosed channel;
the first component being positioned radially outward from the second component, the first component being positioned radially between the second component and a portion of the outer casing.

4. The ball nut of claim 3, wherein the at least one thread groove includes a plurality of adjacent thread grooves including a first thread groove for a first thread start and a first thread groove for a second thread start, wherein the first portion of the at least one thread groove and the second portion of the at least one thread groove are parts of the first thread start such that any bearing ball that traveled between the first portion and second portion of the at least one thread groove through the ball return channel remain associated with the first thread start.

5. The ball nut of claim 4, wherein the first and second openings are axially spaced apart along the central axis such that at least a portion of the first thread groove for the second thread start is located axially between the first and second openings along the central axis.

6. The ball nut of claim 3, wherein:
the at least one thread grooves includes a first thread groove, at least one intermediate thread groove and a last thread groove with the at least one intermediate thread groove positioned axially between the first and last thread grooves along the central axis; and
the first and second openings of the ball return channel being axially spaced along the central axis with the at least one intermediate thread positioned axially between the first and second openings such that a ball traveling through the ball return channel between the first and second openings will travel past the at least one intermediate thread groove.

7. A ball screw comprising:
a ball nut according to claim 3;
a ball screw shaft defining at least one helical ball screw thread groove, the surface portion of the multiliner facing the ball screw shaft; and
a plurality of bearing balls located radially between the at least one ball screw thread and the ball nut.

8. The ball screw of claim 7, wherein:
the at least one ball screw thread groove includes a first ball screw thread groove, at least one intermediate ball screw thread groove and a last ball screw thread groove with the at least one intermediate ball screw thread groove positioned axially between the first and last ball screw thread grooves; and
the first and second openings are axially spaced apart along the longitudinal axis with the at least one intermediate thread groove is positioned axially between the first and last ball screw thread grooves such that as the plurality of bearing balls travel between the first and second openings, the plurality of bearing balls travel past the at least one intermediate thread groove.

9. The multiliner of claim 1, wherein the body is formed from first and second components, the first component forming a portion of the fully enclosed channel and the second component forming a portion of the fully enclosed channel.

10. The multiliner of claim 9, wherein the first and second components are secured together by at adhesive, chemical bonding, or ultrasonic welding.

11. The multiliner of claim 9, wherein the first component forms part of the first and second openings and the second component forms part of the first and second openings.

12. The multiliner of claim 9, wherein:
the body includes a first and a second ball return channel formed in the body;
a dividing wall separates the first ball return channel from the second ball return channel; and
the first component forms part of the dividing wall and the second component forms part of the dividing wall.

13. The ball nut of claim 3, wherein the first and second components of the multiliner are located entirely within the outer case and form no part of a radially outer periphery of ball nut.

14. The ball screw of claim 7, wherein a radial gap is formed by and bounded by a radial outer periphery of the ball screw shaft and the surface portion of the multiliner.

15. The multiliner of claim 1, wherein the surface portion is free of any grooves formed therein.

16. The ball screw of claim 7, wherein the multiliner of the ball nut is free of any portion extending radially into the at least one helical ball screw thread groove.

17. The ball screw of claim 7, wherein:
the ball screw shaft has an outer radial periphery, the at least one helical ball screw thread groove recessed inward from the outer radial periphery, and
a radial gap is formed between the outer radial periphery of the ball screw shaft and the multiliner of the ball nut at all angular positions and at all axial positions.

* * * * *